United States Patent
Strobel et al.

(10) Patent No.: US 11,608,464 B1
(45) Date of Patent: Mar. 21, 2023

(54) SOLID SCALE INHIBITOR

(71) Applicants: Jonathan R. Strobel, Cypress, TX (US); Larry W. Gatlin, Montgomery, TX (US); Mickey Tucker, Montgomery, TX (US); Jason Helander, Richmond, TX (US)

(72) Inventors: Jonathan R. Strobel, Cypress, TX (US); Larry W. Gatlin, Montgomery, TX (US); Mickey Tucker, Montgomery, TX (US); Jason Helander, Richmond, TX (US)

( * ) Notice: Subject to any disclaimer, the term of this patent is extended or adjusted under 35 U.S.C. 154(b) by 0 days.

(21) Appl. No.: 17/729,454

(22) Filed: Apr. 26, 2022

Related U.S. Application Data

(63) Continuation-in-part of application No. 17/332,129, filed on May 27, 2021, now Pat. No. 11,365,343, and a continuation-in-part of application No. 17/241,569, filed on Apr. 27, 2021, now abandoned.

(60) Provisional application No. 63/158,234, filed on Mar. 8, 2021.

(51) Int. Cl.
  *C09K 8/528* (2006.01)

(52) U.S. Cl.
  CPC .......... *C09K 8/528* (2013.01); *C09K 2208/28* (2013.01)

(58) Field of Classification Search
  CPC ........................... C09K 8/528; C09K 2208/28
  See application file for complete search history.

(56) References Cited

U.S. PATENT DOCUMENTS

2010/0108942 A1 * 5/2010 Man ...................... A01N 37/16
  252/186.26

FOREIGN PATENT DOCUMENTS

CN  202829718 U  *  3/2013
CN  112439396 A  *  3/2021

* cited by examiner

*Primary Examiner* — Kumar R Bhushan
(74) *Attorney, Agent, or Firm* — Leavitt Eldredge Law Firm

(57) ABSTRACT

A scale inhibitor includes an amount of hydroxyethylidene diphosphonic acid (HEDP), and an amount of hydroxyapatite. The amounts are combined to form a composition that is long lasting, high activity and completely dissolvable. The composition has a preferred particle size of less than 200 nm. Dicalcium phosphate, tricalcium phosphate, bone and/or bone ash may be used in place of hydroxyapatite.

14 Claims, 8 Drawing Sheets

SOLID SCALE INHIBITOR

BACKGROUND

1. Field of the Invention

The present invention relates generally to chemical reaction products, and more specifically to a long-term solid scale inhibitor for oil and gas wells and water treatment in disposable or producing water wells, including potable water.

2. Description of Related Art

Hydroxyapatite

Hydroxyapatite (also known as hydroxylapatite, HA or HAP, $Ca_{10}(PO_4)_6(OH)_2$; for simplicity's sake referred to below as HA) has long been used for wide applications in both medicine and dentistry. HA (also known as calcium hydroxide phosphate $(Ca_5(OH)(PO_4)_3)$) is the chief mineral component of bones and teeth. Because HA is a naturally occurring mineral, HA has been used in bone grafting procedures due to its very slow dissolution rate (about 10% per year). In recent years, HA has been used in other areas outside of medicine and dentistry such as fertilizer preparation and as additives in animal foods for mineral purposes.

Accordingly, it is an object of the present invention to expand the application use of HA and HA hybrids in oil and gas wells and water treatment.

Solid Scale Inhibitor Application

Fracking operations are well known in the art and are effective means of extracting oil or gas from underground rock formations. In conventional operations, it is common to utilize water or aqueous mixtures, as well as proppant (frac sand), and chemical additives in an injection procedure. The injection procedure utilizes high pressures to create small (millimeter scale) cracks/fractures within the targeted rock formation. Once the formation is adequately fractured, pumps are shut down, pressures are reduced, and the cracks will begin to close. The frac sand, now in place will "prop" open the fractures allowing for oil and gas to flow through the cracks and then to the well. These flow paths will have varying sizes, some of which may only be as large as a grain of sand.

One common problem is the formation of scale within such pathways, cracks, and fractures, which leads to a limited lifespan of the fracking site. It is well documented that only 10-40% of the fluids pumped during a frac operation will be produced back to the surface. The increased concentrations of various ions in the produced water present a higher risk of mineral scaling such as calcium carbonate or calcium sulfate. These precipitates may deposit within the conduits, thereby forming scale buildup, which eventually leads to the closing off and blocking of various fractures, leading to the inability for oil and gas to produce from those fractures.

In order to overcome the above problem, a plurality of solid scale inhibitors have been developed to prevent scale buildup within the underground rock formations. Solid scale inhibitors work within the conduits by removing the scale forming ions and suspended solids from the liquid, thereby slowly preventing the buildup of scale. Scale inhibitors can increase the lifespan of the fracking site, however, there is room for improvement, as conventional scale inhibitors have a limited lifespan within the fracture. In some cases, in effort to prolong the lifespan of scale inhibitor products, they are attached to insoluble/charged surfaces such as diatomaceous earth, clays, graphite or any solid with high surface area. This presents a problem in that once the scale inhibitor is dissolved, the pore spaces are left with an insoluble obstruction which will migrate and buildup within the conduits, cracks and perforations leading to formation damage.

Accordingly, there is a need for a scale inhibitor with an increased lifespan and a decreased particle size for improved anti-scale operations.

Therefore, a wide range of materials have since been utilized. In U.S. Pat. No. 4,357,248A, Berkshire describes injecting a nitrogen containing phosphonate containing a water-soluble ester or amide which hydrolyzes slowly in an attempt to extend the scale inhibiting life of the treatment. The scale inhibitor solution contains additives of calcium chloride, diethylenetriaminepenta (methylenephosphonic acid), sodium bicarbonate- or glycine- and methyl formate. This method has limitations and disadvantages because the precipitation is dependent on pH.

Various additives have been used with a scale inhibitor to cause precipitation of the scale inhibitor. In U.S. Pat. No. 5,346,010A, Adams disclosed the emplacement of a scale inhibitor as diethylenetriaminepenta (methylene phosphonic acid) which utilizes ethylenediaminetetraacetic acid as a chelating agent, amide as urea, formamide, nitrilotriacetic, and citric acid. In U.S. Pat. No. 9,932,516, Conway uses a composition as a naturally occurring metal ion and a metal complexing agent (i.e., a chelant) as citric acid to prevent the interaction between the polymer and the additives in water-based fracturing. These disclosures, however, are not free of limitations. For example, the process of using additives with a scale inhibitor is cumbersome and is not easily controllable. In addition, the use of acidic formulas of chelant limit the treatment life and thus, high pH values in chelants are preferred.

Other methods of oil or gas well treatments for inhibition of scale by solid scale inhibitor have been disclosed. For example, Baker (BJ Hughes) for ScaleSorb utilizes absorption of a scale treatment chemical on a water insoluble adsorbent. This method, however, only utilizes about 20% of the active scale treatment chemical, noted as primarily phosphonate.

Other cited materials include U.S. Pat. No. 8,336,624 by Becker, Gupta. These materials, however, are not solid scale inhibitors. Rather, the materials disclosed are aqueous solutions of phosphonate, acrylate polymers, terpolymers, and hybrids of various phosphorous poly acrylamides. The materials are precipitated and ride on an inert substrate which can be a fouling and plugging additive in the power spaces of a formation, rendering no advantage in terms of a scale inhibitor. These products form a solid solution of, according to their nomenclature, a 20% active, or possibly a 50% active product in water/HCl dried to yield a 10% to 20% dried residue.

Other teachings of most other solid scale inhibitors estimate at maximum of 20% or most likely 10-15% actual active component adsorbed on an inert unreactive solid adsorbent which may in fact cause a plugging agent in itself since it does not dissolve as diatomaceous earth or ceramic spheres.

Solid Scale Inhibitor Squeeze Treatments

Historically, solid scale inhibitors have been injected into a formation at high concentrations as "squeeze" treatments. A precipitation squeeze is when an acidic phosphonate pill is injected into a carbonate formation to cause the precipitation of calcium phosphonate. Adsorption squeezes are often performed in certain noncarbonate reservoirs (e.g., sand) whereby a neutralized phosphonate pill is injected into a sandstone formation.

Within a chemical squeeze treatment, the factors effecting the retention and release of inhibitors are complex. At low concentrations, the phosphate adsorption (to calcite) is strongly favored. At high concentrations, the phosphate adsorption occurs in two steps: (1) the fast chemisorption of phosphate to a limited number of specific surface sites followed by (2) the spontaneous crystal growth on the cluster of surface phosphate ions. Additionally, Stumm and Leckie (1970) postulated a three-step reaction: (1) chemisorption of phosphate to form amorphous calcium phosphate; (2) slow transformation of the amorphous calcium phosphate to hydroxyapatite; and (3) crystal growth of apatite. Long "shut-in" times are routinely used during chemical squeezes to allow for crystal growth. Without adequate time to transform, the inhibitor in amorphous form will be produced from the formation after shut-in.

Accordingly, there is a need to eliminate the steps of phosphate transformation and crystal growth in a reservoir thus allowing direct injection of natural or synthetically formed hydroxyapatite.

SUMMARY OF THE INVENTION

It is an object of the present invention to address the limitations and disadvantages of scale inhibitors and related methods above.

The present invention relates to a composition including a hybrid formation of calcium phosphates with di- and tetra-non-amino phosphonates and aminoethylene phosphonic acid salts. The present invention forms calcium precipitates prior to injection, chemical squeeze or other method into a formation and thus, eliminating the need for long shut-in times necessary to allow phosphonates to react with divalent cations (typically calcium) with high salinity brine or from the formation in order to promote calcium-phosphonate precipitates post injection.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
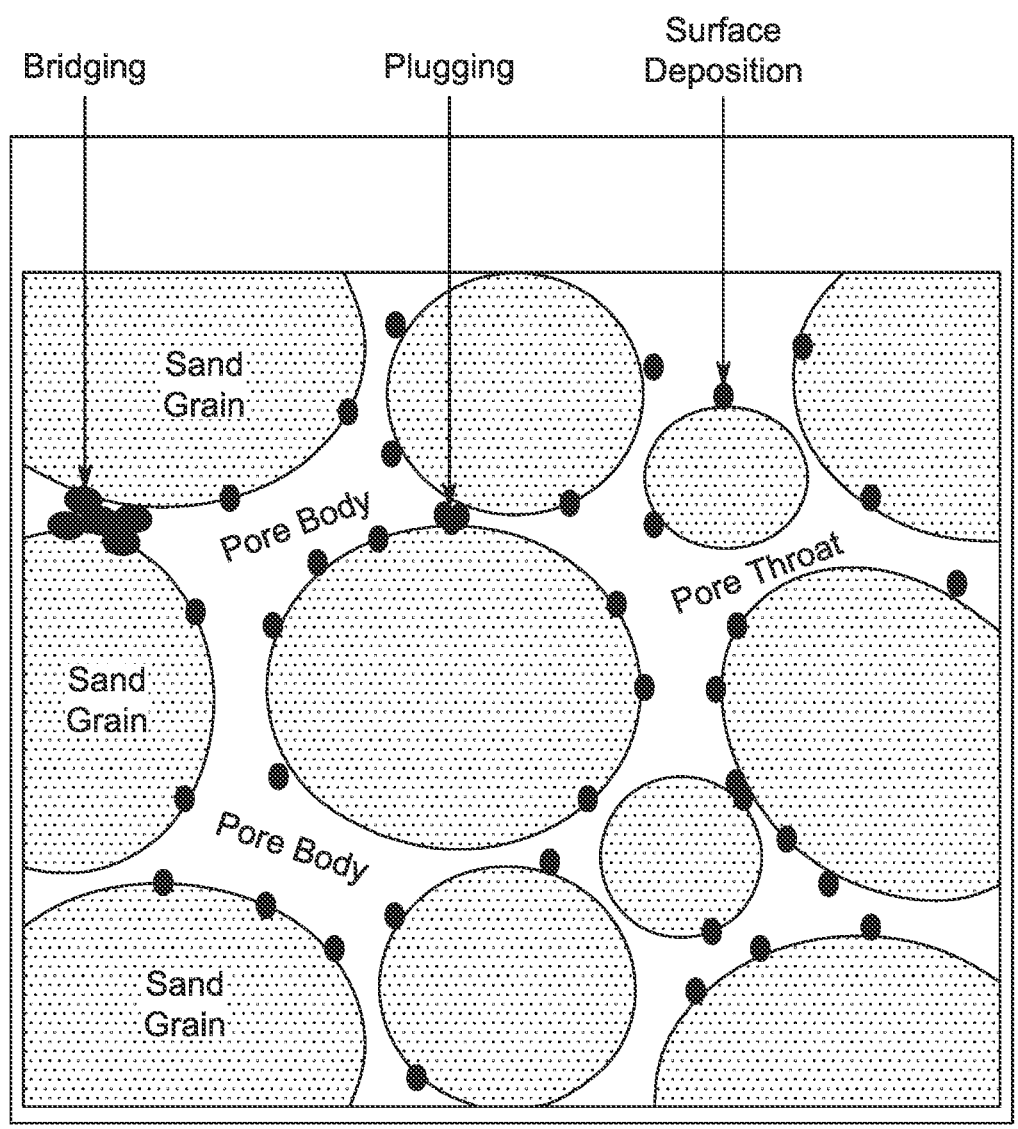
FIGS. 1-3 are schematic representations of fluid flow in porous media and different retention types in a porous medium during production.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

The Composition

The present invention contemplates the use of hydroxyapatite (HA), calcium phosphate mineral and other forms of calcium phosphate such as bone ash, as a solid scale inhibitor which does not require a substrate on which a scale inhibitor is absorbed, or encapsulation is required. The discovery shows a chemical reaction product of calcium phosphates with di- and tetra-, and hexyl- and alkyl-phosphonic acids form a composition which incorporates slow dissolving substrate with a low minimum inhibitor concentration (MIC) scale inhibitor co-reactant that allows small particles to reach adjacent voids in smaller spaces, thereby producing a flow of lower migration and allows the composition to last longer out of high velocity main flow.

The present invention skips the steps of phosphate transformation and crystal growth as proposed by Stumm and Leckie discussed above by directly adding natural or synthetically formed HA. Direct injection of HA allows for customization of the dissolution rate of the resultant solid scale inhibitor when using different ratios of phosphonates and/or polymers. In addition, there are a large number of calcium phosphate solid phases that exist in nature (e.g., $Ca(H_2PO_4)_2 \cdot 8H_2O$, $CaHPO_4 \cdot 2H_2O$, $CaHPO_4$, $Ca_3H_2(PO_4)_6 \cdot 5H_2O$, $Ca_3(PO_4)_2$, and $Ca_5(PO_4)_3OH$).

The composition is a 100% reacted mass and scale inhibitor utilizing hydroxyapatite with phosphonic group, phosphonate, free acids and salts with calcium, sodium, magnesium, etc.

Hydroxyapatite (HA) naturally (e.g., bone) or synthetically derived (e.g., di- and tri-calcium phosphates) is reacted with known solid scale inhibitors and modified to increase the effectiveness at concentrations of 1 ppm or less. Specifically, HEDP free acid noted as SI #4, salt of HEDP, sodium 2 or 4, a salt of EDA tetraphosphonic acid salt of Ca, Na, Chloro derivatives of HEDP, and Aminoalkyl derivatives of HEDP.

The precipitation by the Hielscher Sono manufacturing method allows exceptional number of voids and surface areas, providing a pure form. HA is also obtained from mining of the mineral. Sources are easily obtained from mining near places such as Colorado, Arkansas, New Mexico, Arizona and others.

Bone ash is produced synthetically or ground normally from cattle bones. HA does not use inert binders or additives. A hybrid forms with liquid or solid phosphonic acids or salts dissolve and does not lead to fines migration or formation damage. HA is a semi-soluble phosphate rather than insoluble/inert material with significant surface area. Compounds with inert substrates risk the disruption of particles in a formation and may lead to fines migration or formation damage.

Figure 2:
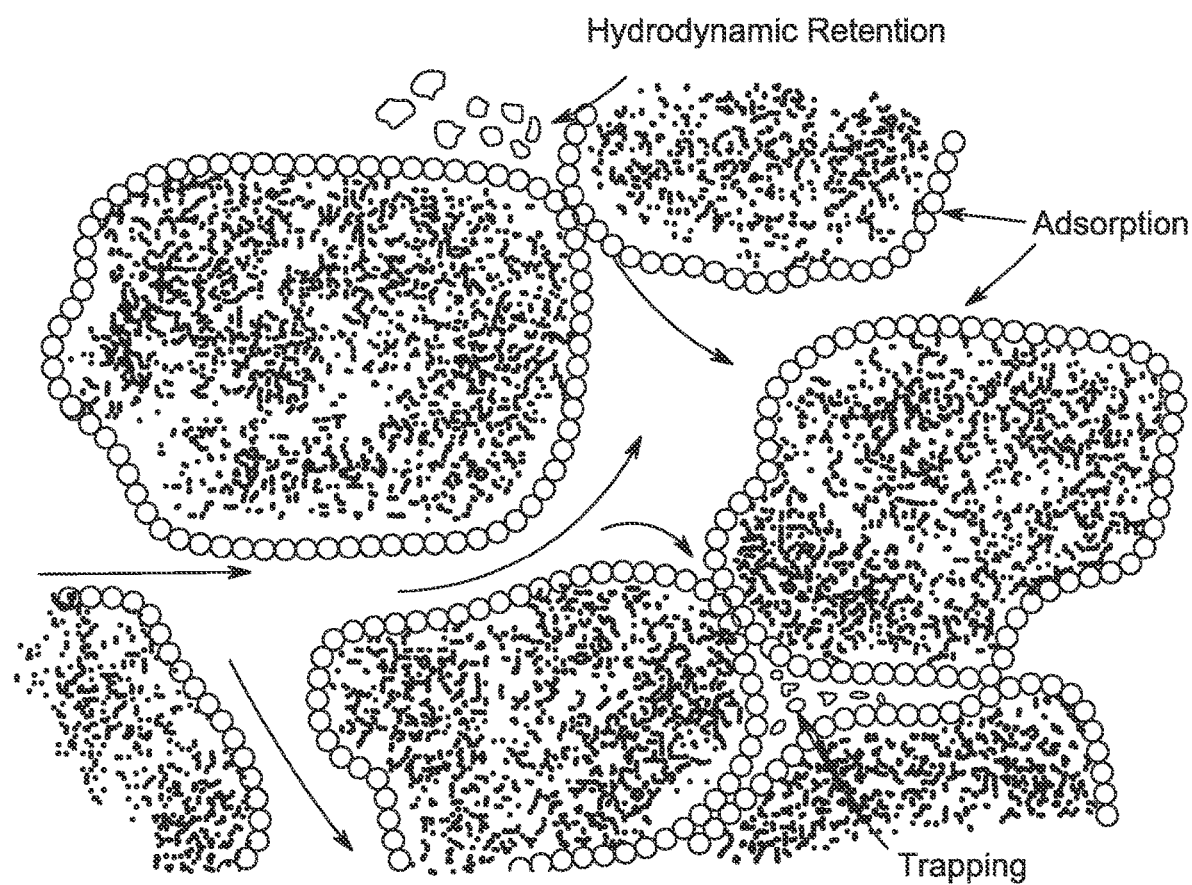
Figure 3:
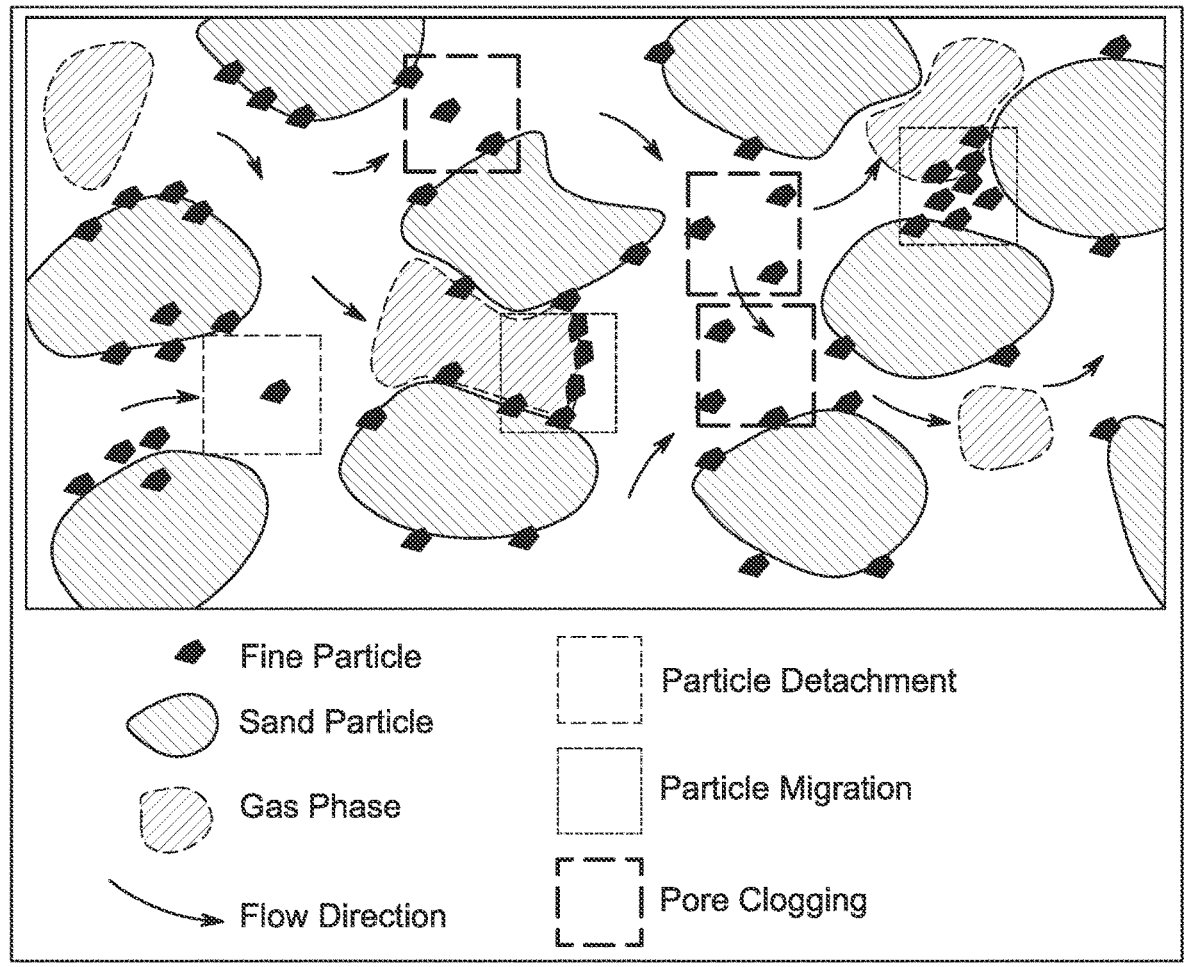
Figure 4:
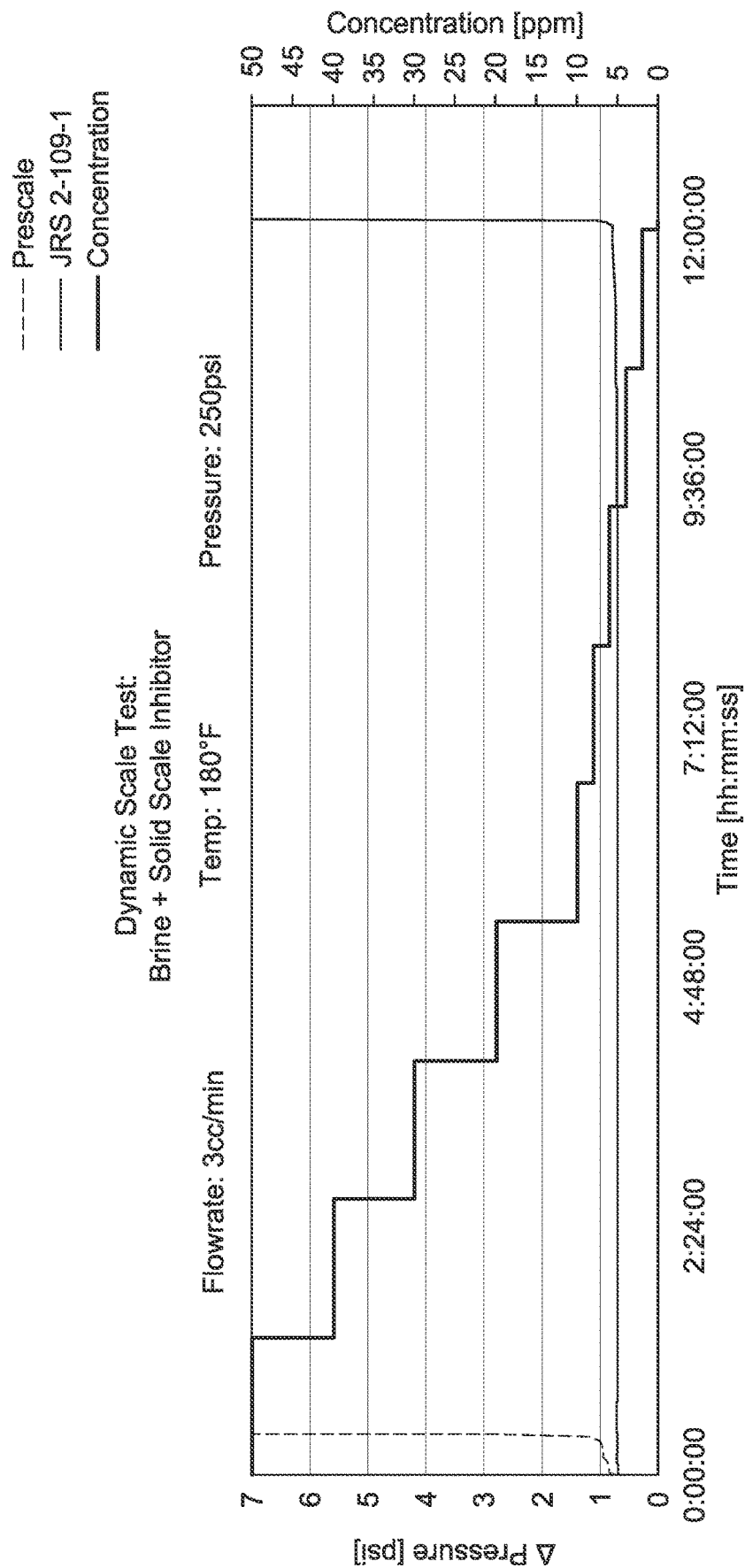
FIG. 4 is a graph of the minimum inhibitor concentration (MIC) measurements from a dynamic scale loop testing on a composition, illustrating the effectiveness of the composition at MIC 2 ppm.
Figure 5:
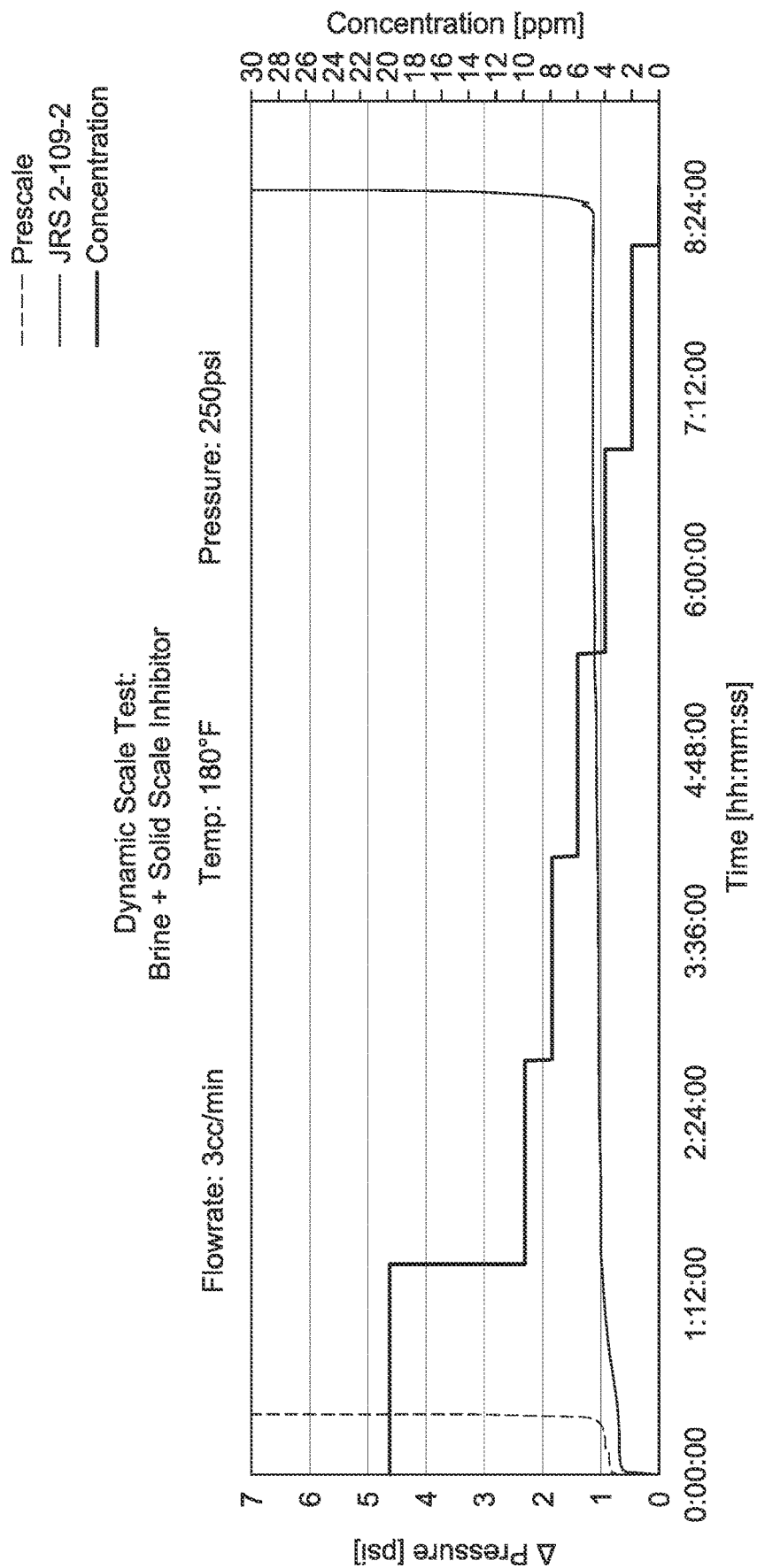
FIG. 5 is a graph of the minimum inhibitor concentration (MIC) measurements of a dynamic scale loop test on another composition, illustrating the effectiveness of the composition at MIC 2 ppm.
Figure 6:
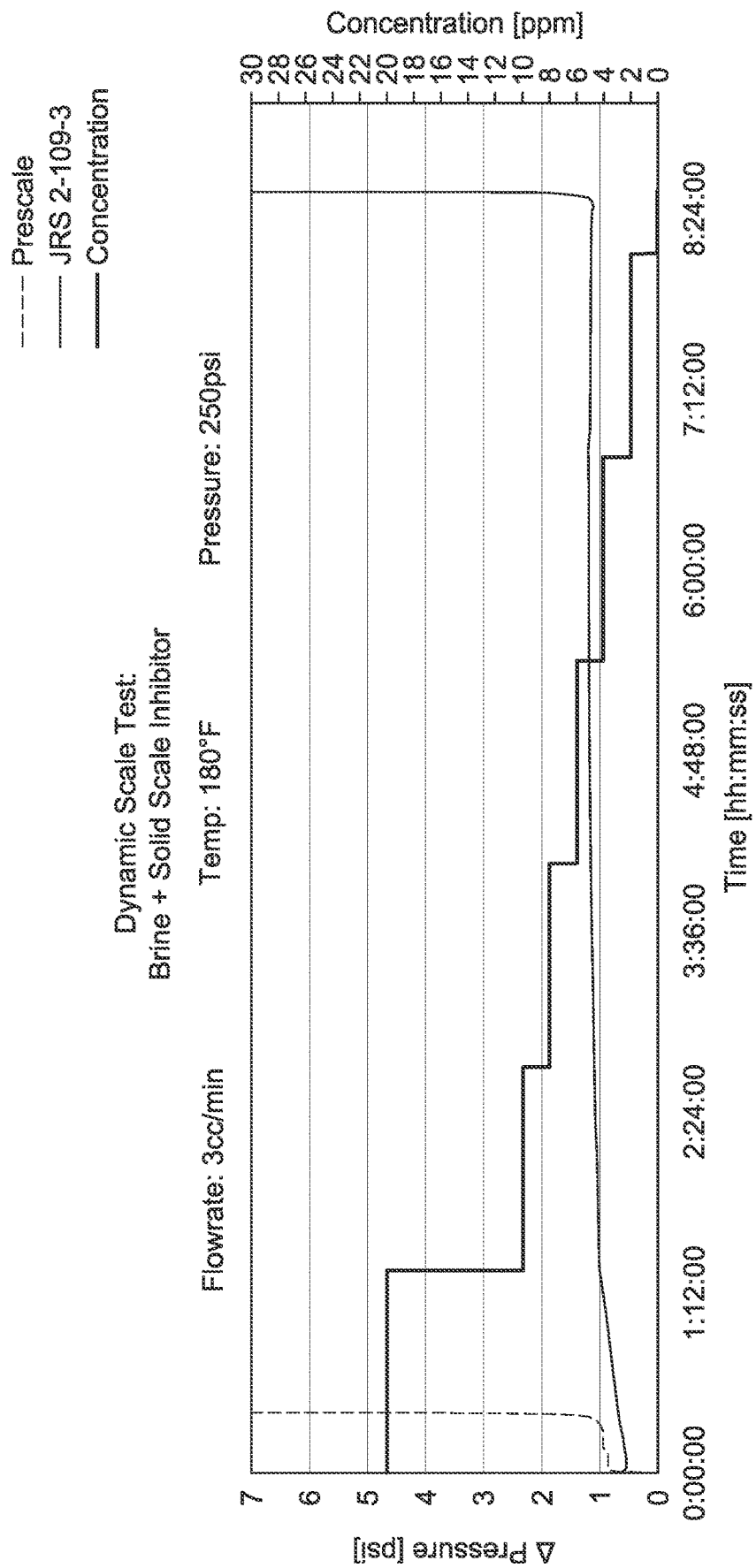
FIG. 6 is a graph of the minimum inhibitor concentration (MIC) measurements of a dynamic scale loop test on another composition, illustrating the effectiveness of composition at MIC 2 ppm.

Referring now to FIGS. 1 through 3, various graphical depictions of fluid flow within porous media during production are depicted, respectively. As it pertains to permeability of porous media, the flow rate of fluid through a sand pack or rock formation is dependent on the following equation from Darcy's law:
(PERMEABILITY, K)=(LENGTH, of the pack) (VISCOSITY, of the fluid) (FLOW RATE, Q)/PRESSURE, differential) (AREA, cross section perpendicular to the flow)

Two important factors which may significantly alter the permeability of a formation or proppant pack are pore size distribution and fines migration. Fracture conductivity and plugging of pore throats from the movement of fines causes a dramatic decrease to flow rates during production. Lowered flow rates and increased pressure required to move fluids through the pore space result in a decrease of overall permeability.

As fluid flows through pore spaces between grains of sand in a frac pack or connected voids of space within the formation it is important to protect against any material (e.g., solid fines, immiscible liquid/emulsions, trapped gas, etc.) that may become present within the pore spaces which leads to changes in pressure and flowrate as described above. This is often referred to as formation damages which may become permanent if left untreated.

Fines migration of a solid (that does not dissolve) can lead to significant formation damage if it stays in major flow paths. The composition of the present application completely dissolves, thus does not have this negative effect. Also, the dissolved composition may adsorb to the surface or become trapped in smaller pore throats out of the way of higher velocity flow decreasing the likelihood of observing formation damage.

Retention of the dissolvable solid inhibitor within the porous media leads to longer transport times across the fracture which serves as a longer lasting scale inhibitor application. Retention of a material in a porous medium may be categorized by three different mechanisms, as shown in FIG. 2. The first is adsorption. Adsorption refers to when a material interacts with a solid surface. The second is mechanical trapping. Mechanical trapping is when solid materials travel to an area of pore space where paths are constricted (i.e., pore throat size is smaller than the migrating material). Mechanical trapping may result from either deformation of a material during accelerated flow rates or as a result of a closing/collapsing of the fracture over time due to conductivity of a solid fracture material. The third is hydrodynamic retention. Hydrodynamic retention refers to an accumulation or aggregation of materials traveling through a porous media controlled by convection-diffusion mechanisms. These regions of converging flow result in pores of increased local concentration.

The preferred size of particles of the composition are less than 200 nm and are soluble in aqueous phases. Smaller sized materials generally travel deeper into fractures during operations presenting further distances of travel back to a wellbore and creating longer times in the fracture. Smaller material also demonstrates the ability to be transported to smaller pore throats outside areas of high velocity flow and can mix with Eddies, similar to a liquid version of a Venturi, pulling applied chemical from the smaller voids. Inert substrates do not offer these phenomena. Also, material smaller than the embedded proppant do not significantly contribute to decreasing conductivity of the fracture. Larger grains of proppant or inert material within the frac provide better initial flow paths or channeling demonstrate better conductivity upfront but tend to break down over the life of the fracture due to fewer points of contact through which pressure is distributed. As decreasing conductivity and flow inevitably occurs, the smaller particles of the composition of the present application are further trapped by the narrowing pore spaces surrounding them. Thus, limiting flow and extending the life span of the composition.

Dissolution of the Composition

Experiments carried out in ceramic cores indicate that precipitation squeezes offer longer squeeze lifetimes and more HEDP retention than adsorption squeezes. Multiple shut-in times offer long life. The calcium-HEDP precipitate in porous media is made up of long, fibrous particles preferentially sitting in pore throats with long tailing region on elution.

The disclosure of the present application is considered a green modification of bone and yields a green scale inhibitor if modified with polyaspartate (PASP) or carboxymethyl inulin (CMI) and polyepoxysuccinic acid. The HA and modifications are found as 100% scale inhibitor adsorbed rather than the so-called 20% scale inhibitor precipitated on an inert medium as taught in the prior art.

Precipitation squeezes are based on the formation of an insoluble inhibitor/calcium salt. This is carried out by adjusting the calcium ion concentration, pH and temperature of polymeric and phosphonate solutions. Other uses may include calcium salts of phosphino-polycarboxylic acid or polyacrylic acid scale inhibitor. The intent is to place more of the inhibitor per squeeze, extending the treatment lifetime. Normally, the precipitation squeeze treatment lifetime exceeds one year, even with high water production rates.

The composition of the present application favors a reacted complex of $Ca_{10}(PO_4)_6(OH)_2$ or 1-hydroxyethyliedene-1, 1-diphosphonic acid, HA/HEDP.

Hydroxyapatites or Hydroxylapatites: Better Known as Calcium Phosphates or Bone Ash The hydroxyapatite (HA) is referred to as the host which improves the reacted scale inhibitor, but the modifiers reactants use the minimum inhibitor concentration (MIC) to very low levels to extend treatable concentrations for very long periods of time approaching years. Performance shows that ethylenediamine-tetraphosphonic, Ca, Na salt, hydroxyethylidene diphosphonic (HEDP), hydroxyethylidene diphosphonic acid, tetra sodium salts ($Na_4$HEDP), hydroxyethylidene diphosphonic acid, di sodium salts ($Na_2$HEDP) and clordronic acid or clodronate disodium (non-nitrogenous) bisphosphonate modifying HA are long term solid scale inhibitors. It is found that the $Na_2$HEDP, (pH=5) performance is more effective than the $Na_4$HEDP (pH=12). Investigations find the free acid HEDP, clodronic acid and alcohol diphosphonic acids work as well by altering the pH with K, Na, Ca, Mg or subsequent hydroxyapatite solutions.

Other starting forms of HA used in the present application may include chloroapatite ($Ca_5(PO_4)_3Cl$), fluorapatite ($Ca_5(PO_4)_3F$ and carbonate rich where $CO_3$ is substituted for some of the $PO_4$($Ca_5(PO_4, CO_3)_3$(OH, O). In the search results, the mineral HA composing about 65% of bones is used extensively in reparation of modifying medical bone regrowth extensively due to the slow dissolution rate and compatibility.

In running solubility tests, HA found negligibly solubility in most fluids except diluted hydrochloric acid, similar mineral acids or some low molecular weight organic and hydroxyorganic acids. Glycine was found to be usable as a reactant. The composition of the present application is found to inhibit a calcium carbonate brine consisting of extreme calcium carbonate precipitations found in many oilfields. The reacted hybrids are also modified to inhibit scales of oxides, sulfides, sulfates of Ba, Sr, Ca, Fe among others. The carbonate rich phosphates of the primary before and after modification reaction may pull out sulfate from sulfate bearing waters and prevent deposition of Ba, Sr, Ca, Fe, Mn, Mg, Na sulfate scales.

It was also found that HA was effective in controlling calcite and magnesite (magnesium carbonate), and dolomite, including iron carbonate. The hydrochloride salt of HA inhibits scale, though not in comparison to its reacted low MIC solid scale inhibitors.

Scales of phosphate composition such as HA or HAP form when orthophosphate increases as the pH approaches and exceeds 9.0 and water is cooled as in chillers. The scale is actually initially amorphous calcium phosphate before hydroxyapatite ($Ca_5(PO_4)$OH, HAP). A known reaction of concentrations of 100, 500, 1000 ppm of a 1.31% solution in 8% HCL, 13.1 ppm as HA does not obtain 100% inhibition at 6.55 ppm, MIC. Therefore, the disclosure of the present application, not previously known, demonstrates that the biomedical and ceramic utilized material and bone, known as HA or HAP, modified (acid salt), is slow-release scale inhibitor. Without modification, HEDP is the best to inhibit deposition of HA mineral scale.

The combination with the adduct of HA/HCL which gives an MIC of 6.55 mg/L based active material with the $Na_2$HEDP which has a MIC of 0-2 mg/L reduces the MIC to 4-6 mg/L and the life is extended at present from a few days to 10 years.

The object of this present application is to replace so called non friendly phosphonate (diethylenetriaminepentamethylphosphonic acid) DETPMP, with the green polyaspartate (PASP), carboxymethyl inulin (CMI) or polyepoxysuccinic acid. The composition of the present application is also friendly as it is a natural occurring mineral, hydroxyapatite, a slow dissolution on the order of 10% per year. The composition also does not require a tag where HA or modified HA utilize standard phosphorous by induced coupled plasma (ICP) instrument. The composition also does not require precipitation as it occurs as a solid in nature. Additionally, the composition by bone or modified HA with coprecipitation with solid phosphonate salts does not require complex reactions and especially does not contain excess hydrochloric acid catalyst of other known reactions.

Characteristics and Adsorption Properties of Apatite

From Somasundaran and Y. H. C. Wang (1982), it is known that the adsorption of surfactants and polymers on apatite is governed by their electrochemical properties determined by pH and the concentration of calcium, phosphate, and fluoride. Both natural ore apatite ($Ca_{10}(PO_4)_6(FOH)_2$) and synthetic hydroxyapatite were used in this study. Zeta potential of natural and synthetic hydroxyapatite as a function of pH at different ionic strengths resulted in changes to the surface Zeta Potential. Phosphate addition makes the mineral more negatively charged and calcium makes it more positively charged under all pH conditions. Fluoride was found to make the mineral more positively charged in acidic solutions and more negatively charged in alkaline solutions. From this study it is concluded that within apatite systems containing other minerals, alterations in surface composition are possible depending on the mineral solution equilibria at various pH values. This resultant electrochemical nature of the mineral will play a governing role in the adsorption of surfactants and polymers.

It should be appreciated that by increasing or decreasing the total pH of the apatite system, the Zeta potential can be adjusted to accommodate the adsorption of apatite to surfactants and polymers as well as proppant type and well lithology.

Dynamic Scale Loop Testing of the Composition

Figure 7:
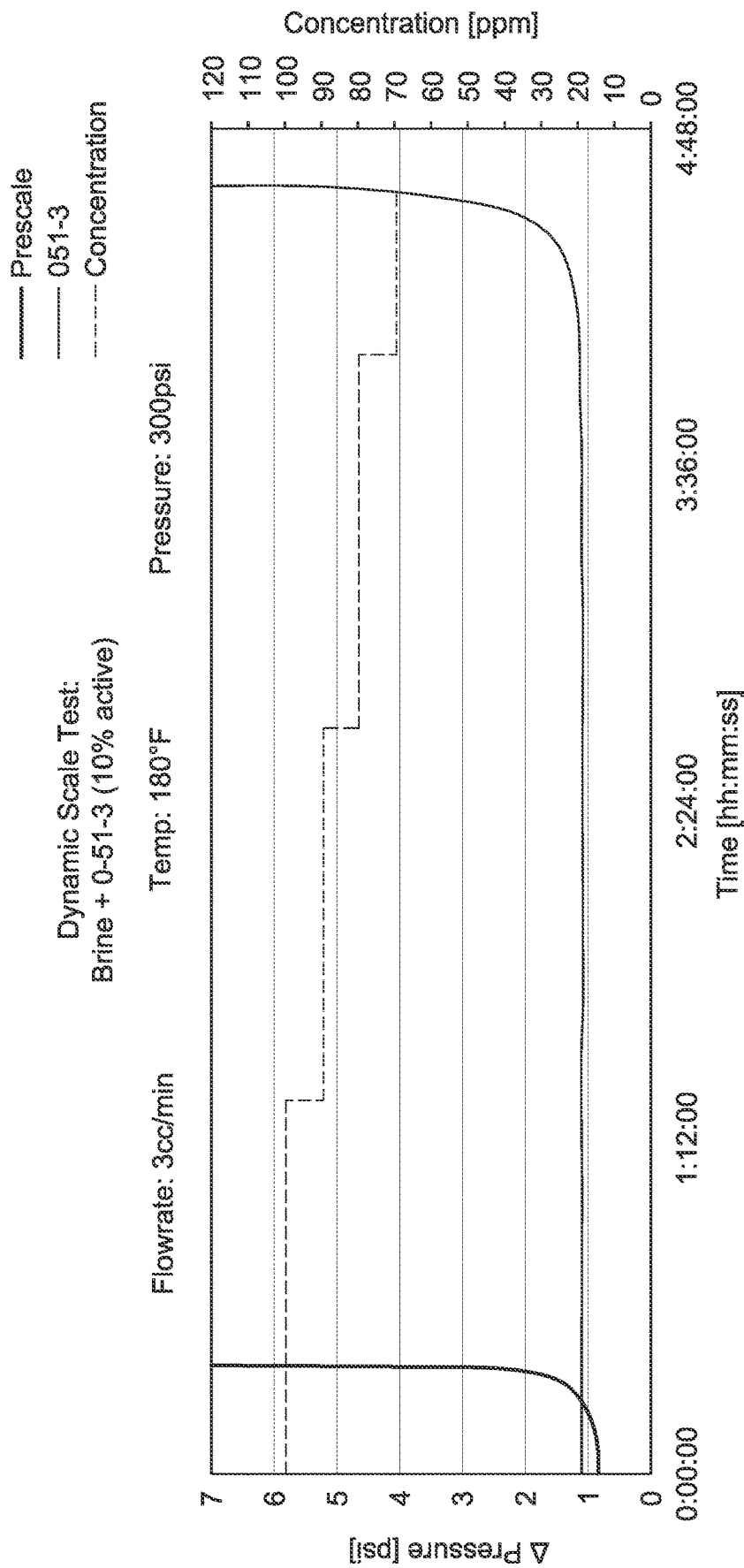
FIG. 7 is a graph of the minimum inhibitor concentration (MIC) measurements of a dynamic scale loop test on another composition, illustrating the effectiveness of the composition at MIC 80 ppm.
Figure 8:
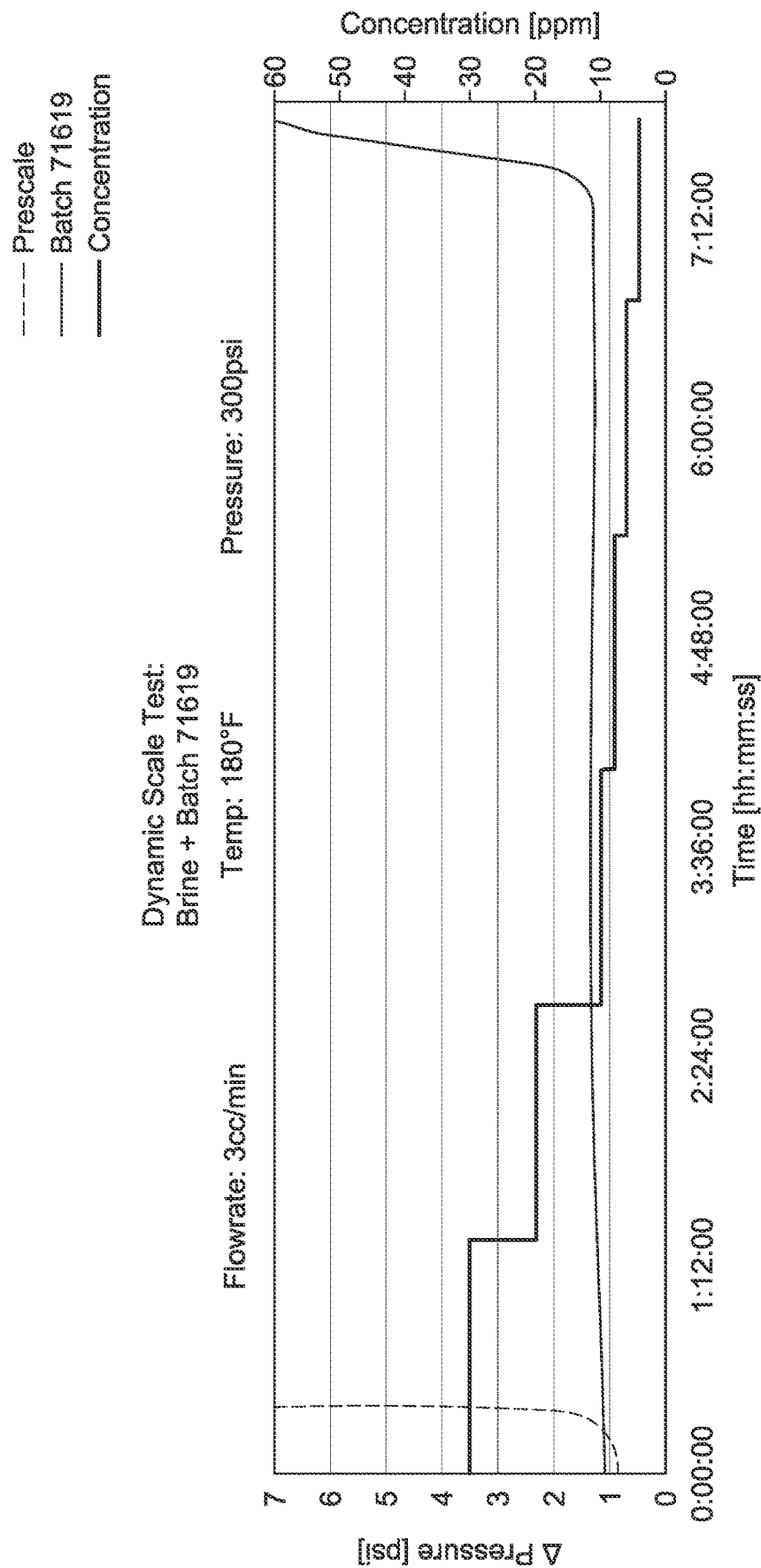
FIG. 8 is a graph of the minimum inhibitor concentration (MIC) measurements of a dynamic scale loop test on another composition, illustrating the effectiveness of the composition at MIC 6 ppm.

Referring now to FIGS. 4 through 8, various graphical representations of the minimum inhibition concentration (MIC) measurements of the composition are depicted. Dynamic scale loop (DSL) testing was used to demonstrate the MIC of the composition. In FIGS. 4, 5, 6 and 8, the composition comprised of varying combinations HA including HEDP and HA. As shown, the MIC values were measured about between 2 and 8 ppm and thus show the composition's ability to inhibit scale. In FIG. 7, the composition comprised of dissolved HA (using HCl and water) its MIC value was measured about between 70 and 80 ppm and thus show the scale inhibitive properties of HA on its own When HA is combined with HEDP or other chosen phosphonates or polymers, the resulting composition offers both long term and low MIC for preventing scale.

Summary of Examples: Reacted Hybrids, Reaction of HA with Low MIC More Soluble Phosphonates Example 1 combined 10.4883 g of hydroxyapatite, 40.00 g of DI water and 19.6749 g of HEDP, 60%. The slurry started off white then slightly transparent for a moment when HEDP liquid is added. The mixture formed into a solid within minutes.

Example 2 combined 10.3202 g of hydroxyapatite, 39.9404 g of DI water and 35.7960 g of HEDP, 60%. The mixture formed into a solid almost immediately.

Example 3 combined 15.2138 g of hydroxyapatite, 46.6498 g of 0-51-3 (mixture of hydroxyapatite in DI water with 15% hydrochloric acid) and 35.1282 g of HEDP, 60%.

The mixture was stirred at 400 rpm and was solid within seconds. The resultant composition was a harder material, and more heat was observed during the reaction.

Example 4 combined 15.2270 g of hydroxyapatite, 39.8209 g of DI water and 33.5644 g of JRS 2-109-3. This mixture had turned solid in a prior test, but when repeated did no solidify. Adding 7.1199 g of hydroxyapatite also did not solidify. Adding HEDP, 60% hardened after 35.5429 g.

Example 5 combined 10.0751 g of hydroxyapatite, 41.7017 g of HCl (7.5%) and 26.6645 g of a mixture C comprising 20 g JRS 2-109-2, 20 g DI water and 10 g (15%) HCl. The mixture was stirred at 200 rpm and turned solid within minutes.

Example 6 combined 10.8849 g of hydroxyapatite, 41.7017 g of HCl (7.5%), 10.8568 g of JRS 2-109-3 and 10.1542 g of JRS 2-109-3. The slurry was liquid at the first 10 g of JRS 2-109-3 but turned solid after the second 10 g was added.

Example 7 combined 10.6436 g of hydroxyapatite, 41.6266 g of HCl (7.5%) and 26.7633 g of a mixture B comprising 20 g JRS 2-109-1 and 20 g DI water. The mixture did not need HCl to mix 50/50 blend of solid SI and DI water. The mixture did not solidify. Adding 6.0947 of the mixture turned to a softer solid.

Example 8 combined 10.1755 g of hydroxyapatite, 41.7649 g of HCl (7.5%) and 21.7649 g of SI #4. SI #4 is 90% active/crystalline HEDP import. The mixture made a solid white composition within minutes.

Example 9 combined 20 g of hydroxyapatite and 50 g of a mixture C comprising 20 g JRS 2-109-2, 20 g DI water and 10 g (15%) HCl. The mixture did not solidify but was a very viscous liquid. Adding 41.7 g of HCl (7.5%) and the slurry turned solid before the full amount was added. A layer of liquid remained on top and weighed 13.51 g. About 28.2 g of HCl (7.5%) was needed to turn this reaction solid. The final formula included 20 g of hydroxyapatite, 50 g of mixture C and 28.2 g of HCl (7.5%).

Example 10 combined 25.0463 g of SI #4, 9.7139 g DI water (cold) and 10.1246 g hydroxyapatite. The mixture was stirred and 7.5% HCl was added until solid.

Example 11 combined 28.7115 g HEDP, 60% and 10.0640 g hydroxyapatite. The mixture turned solid almost instantly but did not mix with solid hydroxyapatite evenly. High heat was used with the reaction.

Example 12 combined 29.0035 g HEDP, 60%, 0.4970 g surfactant and 10.3306 g hydroxyapatite. The mixture was stirred at 800 rpm while adding hydroxyapatite. The composition was very hard with lots of heat and quick to solidify.

Example 13 combined 10 mL HEDP (60%), 5 ML KOH (45%), and 10 g solid tricalcium phosphate. This mixture resulted in solid composition with higher pH values than previous examples.

Example 14 combined 15 g of solid disodium HEDP with 10 g water. Once the mixture was dissolved, 10 g solid tricalcium phosphate was added. Again, the mixture resulted in solid composition with higher pH values than previous examples.

Example 15 combined 10 mL HEDP (60%), 10 mL polyaspartic acid (40%), and 10 g tricalcium phosphate. HEDP (60%) and polyaspartic acid (40%) were mixed first and then tricalcium phosphate was added. This combination formed a solid composition.

Example 16 combined 19.21 g of solid HEDP (90%) with 10 g tricalcium phosphate and then 9.61 g of water. This combination formed a solid composition. The pH of the composition was 2.95 at 1%. The previous example (i.e., Example 16) was repeated adding 45% KOH to the 9.61 g of water at different weights for pH adjustments (e.g., 1, 2, 3 and 4 g of 45% KOH). This resulted in pH measurements of 3.23, 3.39, 4.88 and 5.14, respectively.

The disclosure of the present application contemplates treatment of oil and gas wells and water source wells. The approach to using solid scale inhibitors is much better than conventional chemical treatment methods such as squeeze, continuous injection, batch treatment with liquid chemicals or using liquid chemicals in fracturing (stimulation treatment). The slow dissolution of the solid SI is more effective. Treatment costs are less as the chemical cost is less than the related pumping and maintenance charges. This was carried out in ceramic cores, showing precipitation squeezes offer longer life and more HEDP retention than adsorption squeezes. Micromodel experiments show that the calcium-HEDP precipitate placed in porous media is made up of long, fibrous particles preferentially situated in pore throats. The elution from micro models indicates that slow dissolution of apparently strong pore throat plugs dictates the long tailing region.

It should be appreciated that one of the unique features believed characteristic of the present application is the mineral known as hydroxyapatite or hydroxylapatite, $Ca_5(OH)(PO_4)_3$, being a solid scale inhibitor in its parent form, can be modified with polyphosphonates, primarily the bis or tetra forms of alkyl or aminomethylenephosphonic acids to form a long lasting, high activity, completely dissolvable product for use in frac or squeeze application and can include other non-phosphate scale inhibitors. The composition of the present application is a reaction which is promoted to a delayed precipitate, decanted and collect the solids and dried. The particles are made more uniform by sintering.

Hydroxyapatite, the linear formula, functions for this solid scale inhibitor as well as hydroxylapatite, hydrated calcium phosphate, the repeating unit, the polymeric form. These are commonly referred to as bone and when burned are bone ash.

The particle size of greatest use is <200 nm of either the calcium phosphate forms as a slow dissolving solid scale inhibitor.

In very tight gas formations, known as shale, the nano food grades can be used to prevent any formation damage in the form of powders or emulsions.

The hybrid reaction of the composition of the present application allows use of much higher temperatures than conventional forms of phosphate or combination with non-phosphate scale inhibitors, including the green or polymeric sulfonate, PPCA or terpolymers.

The composition may inhibit carbonate scales with MIC as low as 0-2 ppm (mg/L). The hybrid can use a modifier as Lauryl Alcohol diphosphonic acid and lower alcohols to produce oil dispersible long-term solid scale inhibitors with the amino terminal group.

The host phosphorous compounds are primarily made of metaphosphates and not the insoluble orthophosphates. Phosphate recovery from spend solutions to enhance conversion the phosphate in the form of hydroxyapatite is formed with pH>10, with Brushite forming at pH<10, and investigations of SI properties are not yet determined with Brushite. All calcium phosphate work sufficiently as the host with various extended treatments with modifiers.

The application of HA and HA hybrids or HA adducts are best applied directly in frac and water to obtain long life of residual when flushed with 7.5% to 20% HCl or 3% to 38% muriatic acid.

Acid stimulation cleanup jobs in the near well bore region can enhance the dissolution rate of the mineral deposited with the fracture pack thus releasing scale inhibitor at a higher rate during production flow. The small size of the material allows for use in smaller grain sized proppant packs without adversely affecting conductivity of the frac.

It is also contemplated that the composition works with either anionic and cationic friction reducers. The anionic and cationic friction reducers may coat the particles of the composition so that the particles are not subject to dissolution on travel to the formation or in the formation.

It is further contemplated that the formation of the reactant hybrid may use dicalcium phosphate, tricalcium phosphate, bone or bone ash in place of hydroxyapatite. Bone and/or bone ash may be derived from cattle bones. The composition is also suitable to control scale deposition of carbonates, sulfates and oxides up to temperatures in the maximum range of 450 to 480 degrees Fahrenheit.

The disclosure of the present application may apply to treatment for corrosion in oilfield oil and gas wells in downhole tubulars and gathering systems. Treatment of phytic acid by adsorbing hydroxyapatite to replace a monomolecular layer on the acid may cause the product to be slower than hydroxyapatite along, thereby making a stronger advantage. It may reduce the solubility in acid and water of hydroxyapatite in direct relation to an amount adsorbed.

The composition may be modified with lime or hot lime to enhance the deliberate reduction in dissolution extending the life of the scale. Squeeze or frac treatments for scale inhibition of the calcium, magnesium, strontium, barium, iron II or iron Ill scales in form of carbonates, sulfates, oxides, sulfides among others. The hydroxyapatite may be reacted with phosphate to produce a more linear reactant hybrid to cause a molecule that can migrate further in voids out of the primary high velocity flow.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A solid scale inhibitor, comprising:
    a hydroxyethylidene diphosphonic acid (HEDP); and
    a hydroxyapatite;
    wherein the amount of HEDP, and the amount of the hydroxyapatite are combined to form a composition; and
    wherein the amount of HEDP is between about 60% to about 90% by mass of the composition.

2. The solid scale inhibitor of claim 1, wherein the amount of the hydroxyapatite is about 10% to about 40% by mass of the composition.

3. The solid scale inhibitor of claim 1, wherein the hydroxyapatite is in a polymeric form.

4. The solid scale inhibitor of claim 1, wherein the composition has a particle size of less than 200 nm.

5. The solid scale inhibitor of claim 1, wherein the hydroxyapatite is flushed with one of about 7.5% to about 20% hydrochloric acid and about 3% to about 38% muriatic acid.

6. The solid scale inhibitor of claim 1, wherein lower alcohols are used to produce oil dispersible long-term solid scale inhibitors with an amino terminal group.

7. The solid scale inhibitor of claim 1, wherein the composition is compatible with anionic and cationic friction reducers.

8. The solid scale inhibitor of claim 7, wherein the anionic and cationic friction reducers coat particles of the composition such that the particles are not subject to dissolution on travel to or in a formation.

9. The solid scale inhibitor of claim 1, wherein an amount of dicalcium phosphate replaces the amount of hydroxyapatite.

10. The solid scale inhibitor of claim 1, wherein an amount of tri-calcium phosphate replaces the amount of hydroxyapatite.

11. The solid scale inhibitor of claim 1, wherein an amount sourced from one of bone, bone ash, or both replaces the amount of hydroxyapatite.

12. The solid scale inhibitor of claim 11, wherein the amount sourced from one of bone, bone ash, or both is derived from cattle bones.

13. The solid scale inhibitor of claim 1, wherein the composition controls scale deposition of carbonates, sulfates and oxides up to temperatures in a maximum range of about 450° F. to about 480° F.

14. The solid scale inhibitor of claim 1, wherein the composition is capable of adjusting surface zeta potential of hydroxyapatite from a function of pH at in a range of ionic strengths.

* * * * *